United States Patent Office 2,984,559
Patented May 16, 1961

2,984,559
CONTROLLING VEGETATION WITH HALOALKYL THIONOCARBAMATES

John J. D'Amico, Nitro, W. Va., assignor to Monsanto Chemical Company, St. Louis, Mo., a corporation of Delaware No Drawing. Filed Mar. 10, 1958, Ser. No. 720,056

13 Claims. (Cl. 71—2.5)

The present invention relates to methods of controlling or destroying vegetation employing as the toxicant haloalkyl thionocarbamates.

The toxicants employed in the practice of the present invention contain the nucleus

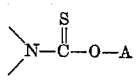

where A represents a halogen substituted alkyl group, preferably a chloro or bromo substituted lower alkyl group. The dangling valences on the nitrogen may be satisfied by a wide variety of non aromatic organic radicals but not by hydrogen. In other words, the nitrogen atom should be linked to three carbon atoms. For example, the dangling valences on the nitrogen may be satisfied by members of the class consisting of open chain saturated and unsaturated non aromatic radicals and divalent aliphatic radicals which, with the nitrogen, constitute a heterocyclic group. By non aromatic radicals are meant radicals in which the carbon attached to the nitrogen in the above nucleus is not part of an aromatic ring.

Examples of the toxicants comprise 2-chloroethyl, 2-bromoethyl, 2-iodoethyl, 2-fluoroethyl, chloromethyl, 2,3-dichloro-2-methylpropyl, 3-chloropropyl, 2-chloropropyl, 2-chlorobutyl, 2-chloroamyl, 2,3-dichloropropyl and 2,3-dibromopropyl esters of the following thionocarbamic acids: dimethyl-, diethyl-, dipropyl-, diisopropyl-, dibutyl-, diisobutyl-, diallyl-, (allyl)isopropyl-, (methyl)cyclohexyl-, (ethyl)cyclohexyl-, di(methoxyethyl)-, di(methoxypropyl)-, (2-cyclohexenyl)isopropyl-, (2-cyanoethyl)isopropyl-, (2-chloroallyl)isopropyl-, (2-chloroallyl)3-methoxypropyl-, di(ethoxypropyl), di(2-phenoxyethyl)-, (ethyl)2 - phenoxyethyl-, di(2 - chloroallyl)-, (ethyl)vinyloxyethyl- and (ethyl)isopropoxypropylthionocarbamic acids, 4-morpholinecarbothionic acid, 1-pyrrolidinecarbothionic acid, 4-phenyl-1-piperazinecarbothionic acid, 1-piperidinecarbothionic acid, 2-methyl-1-piperidinecarbothionic acid, 5-ethyl-2-methyl-1-piperidinecarbothionic acid, 5-ethyl-3-methyl-1-piperidinecarbothionic acid, 2,4,6-trimethyl-1-piperidinecarbothionic acid and 2,6-dimethylmorpholinecarbothionic acid.

For the most part the compounds employed in the practice of this invention are new compounds. They may, however, be prepared by the standard techniques of which the following are illustrative.

There was charged to a reaction vessel 241.6 grams of 2-chloroethanol, 212 grams of sodium carbonate and 600 ml. of dry benzene. To the slurry so prepared there was added in one portion at 25° C. 302.4 grams of diethyl thiocarbamyl chloride. The reaction mixture was then heated slowly to refluxing temperature, stirred and heated at refluxing temperature for 5 hours, then cooled to 25° C. and filtered. The benzene and excess 2-chloroethanol were removed by distillation at atmospheric pressure and the residue distilled in vacuo, collecting the fraction B.P. 134–136° C./15 mm. The yield of 2-chloroethyl diethylthionocarbamate was 67.5%.

To a reaction vessel was charged 31 grams of 2-chloroethanol, 20.2 grams of sodium carbonate and 200 ml. of benzene. To the slurry so prepared 34 grams of dipropylthionocarbamate was added in one portion at 25° C. The reaction mixture was heated at refluxing temperature for 5 hours, cooled to 25° C. and filtered. The benzene and excess 2-chloroethanol were removed by distillation. The residue was then heated to a maximum temperature of 80–90° C. at 1–2 mm. for 3 hours. The cooled residue was filtered to remove a small amount of impurities, to obtain a yield of 68.4% of 2-chloroethyl dipropylthionocarbamate. Analysis gave 6.2% nitrogen, 13.7% sulfur and 16.2% chlorine as compared to 6.3% nitrogen, 14.3% sulfur and 15.9% chlorine calculated for $$C_9H_{18}ClNOS$$

Properties of other products obtained in similar manner are recorded below:

| Compound | Physical Appearance | Yield, percent | Analysis | |
|---|---|---|---|---|
| | | | Calcd., percent | Found, percent |
| 2-Chloroethyl diisopropylthionocarbamate. | amber oil | 91.9 | N 6.3<br>S 14.3<br>Cl 15.9 | 6.1<br>13.7<br>15.8 |
| 3-Bromopropyl diethylthionocarbamate | ---do------ | 56.7 | N 5.5<br>S 12.6 | 4.9<br>12.2 |
| 2-Chloroethyl dibutylthionocarbamate. | ---do------ | 75.9 | N 5.6<br>Cl 14.1 | 5.4<br>14.0 |
| 2-Bromoethyl diethylthionocarbamate. | ---do------ | 55.0 | S 13.4 | 13.3 |
| 2-Chloroethyl dimethylthionocarbamate. | ---do------ | 88.5 | N 8.4 | 8.0 |
| 3-Chloropropyl diethylthionocarbamate. | ---do------ | 79.6 | N 6.7 | 6.1 |
| 4-Chlorobutyl diethylthionocarbamate. | ---do------ | 58.5 | N 6.2<br>Cl 15.8 | 6.3<br>15.2 |

To a reaction vessel was charged 80.5 grams of 2-chloroethanol, 53 grams sodium carbonate and 400 ml. of benzene. This slurry was stirred while adding to it 82.8 grams of morpholinyl thiocarbonyl chloride. The reaction mixture was heated at refluxing temperature for 5 hours, cooled to 25° C. and sodium chloride removed by filtration. The benzene and excess alcohol were removed by distillation and the residue heated at a maximum temperature of 80–90° C. under 1–2 mm. pressure for 3 hours. The residue was cooled and to the cooled solid residue 400 ml. of acetone was added. The acetone solution was filtered to remove the impurities and the acetone removed in vacuo at a maximum temperature of 30° C. The resulting solid was dried on a porous plate to obtain 86% yield of 2-chloroethyl 4-morpholinecarbothionate, M.P. 41–43° C. After recrystallization from heptane the product melted at 49–50° C. Analysis gave 15.3% sulfur and 16.3% chlorine as compared to 15.3% sulfur and 16.9% chlorine calculated for $C_7H_{12}ClNO_2S$.

The most effective control was observed from preemergent application whereby the toxicants were brought into contact with germinating seedlings but they are also somewhat toxic to foliage. By application to vegetation is meant either application to the soil before the plants emerge or to the foliage. The toxicants may be applied to the soil or to foliage conveniently in the form of a spray containing the active ingredient in a concentration within the range of 0.1%–5.0%. For pre-emergence application amounts within the range of 1 to 60 pounds per acre are recommended. The active components are insoluble in water but they are soluble in common organic solvents. They may be dispersed directly in water or dissolved first in an organic solvent and then dispersed. As dispersing and wetting agents there may be employed soft or hard sodium or potassium soaps, alkylated aromatic sodium sulfonates such as sodium dodecylbenzenesulfonate, or an amine salt of dodecylbenzenesulfonic acid, alkali metal salts of sulfated fatty alcohols, ethylene oxide condensation products of alkyl phenols or tall oil and other dispersing and wetting agents. The herbicides may be formulated and applied as dry compositions by mixing the toxicant with a finely divided solid carrier, as for example talc, clay, pyrophyllite, silica and fuller's earth. Alternatively, the dry composition may be dispersed in water and applied as a spray.

As illustrative of the practice of the invention 2-chloroethyl diethylthionocarbamate was applied as an aqueous spray to a variety of germinating seedlings. The active ingredient was emulsified in water and applied to the soil of seeded plots at the rate shown before the grass or other plants emerged. The plants employed in the test are designated by letter. The plants corresponding to the letters are as follows:

A—Morning glory
B—Wild oat
C—Brome grass
D—Rye grass
E—Buckwheat
F—Mustard (radish)
G—Beet-sugar
H—Cotton
J—Corn
K—Foxtail
L—Crab grass
M—Field bindweed
N—Pigweed

| Dosage, Lbs./Acre | Phytotoxicity Rating [1] | | | | | | | | | | | | |
|---|---|---|---|---|---|---|---|---|---|---|---|---|---|
| | A | B | C | D | E | F | G | H | J | K | L | M | N |
| 25 | 0 | 3 | 3 | 3 | 3 | 2 | 3 | 3 | 0 | 3 | 3 | 2 | 3 |
| 5 | 0 | 3 | 3 | 3 | 3 | 0 | 0 | 0 | 0 | 3 | 3 | 0 | 2 |
| 1 | 0 | 2 | 2 | 3 | 3 | 2 | 0 | 0 | 0 | 0 | 0 | 0 | 2 |

[1] For convenience in recording the data, the following rating key was used:

No phytotoxicity ---------------------------------------- 0
Slight phytotoxicity ------------------------------------- 1
Moderate phytotoxicity ---------------------------------- 2
Severe phytotoxicity ------------------------------------ 3

The foregoing is illustrative only of the useful class herein defined, any of which control vegetation although the amounts required for effective control will vary. Optimum results are apparently achieved with 2-chloroethyl and 2-bromoethyl esters represented by:

2-bromoethyl N-isopropyl N-allylthionocarbamate,
2-chloroethyl N-isopropyl N-allylthionocarbamate,
2 - chloroethyl N - 2 - chloroallyl N - isopropylthionocarbamate,
2 - bromoethyl N - 2 - chloroallyl N - isopropylthionocarbamate,
2-chloroethyl N-2-chloroallyl N-3-methoxypropylthionocarbamate,
2-chloroethyl diallylthionocarbamate,
2-chloroethyl 1-pyrrolidinecarbothionate,
2-bromoethyl 1-pyrrolidinecarbothionate,
2-chloroethyl 1-piperidinecarbothionate,
2-chloroethyl 5-ethyl-2-methyl-1-piperidinecarbothionate and
2-chloroethyl 5-ethyl-3-methyl-1-piperidinecarbothionate.

It is intended to cover all changes and modifications of the examples of the invention herein chosen for purposes of disclosure which do not constitute departures from the spirit and scope of the invention.

What is claimed is:

1. The method of destroying vegetation which comprises applying thereto a phytotoxic amount of a composition containing as the essential active ingredient a halogen substituted alkyl ester of a thionocarbamic acid in which the alkyl ester group contains less than five carbon atoms and in which the nitrogen is attached to one cyclohexyl group and to one lower alkyl group.

2. The method of destroying vegetation which comprises applying to germinating seedlings a phytotoxic amount of a composition containing as the essential active ingredient a compound of the structure

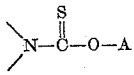

where A represents a halogen substituted alkyl group containing less than five carbon atoms and the valences on the nitrogen are satisfied by a member of the group consisting of lower alkyl, lower alkenyl, halogen substituted lower alkenyl, cyclohexyl, cyclohexenyl, cyanoethyl, phenoxy substituted lower alkyl, alkoxy substituted lower alkyl, alkenoxy substituted lower alkyl, and aliphatic divalent radicals which, with the nitrogen, constitute a heterocyclic radical selected from the group consisting of morpholinyl, 2,6 - dimethylmorpholinyl, pyrrolidinyl, 4-phenyl-1-piperazinyl, piperidino, 2-methylpiperidino, 5-ethyl-2-methylpiperidino, 5-ethyl-3-methylpiperidino and 2,4,6-trimethylpiperidino.

3. The method of destroying vegetation which comprises applying to germinating seedlings a phytotoxic amount of a composition containing as the essential active ingredient a compound of the structure

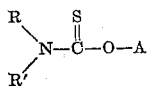

where R and R' are lower alkyl groups and A is a halogen substituted ethyl group.

4. The method of destroying vegetation which comprises applying to germinating seedlings a phytotoxic amount of a composition containing as the essential active ingredient a compound of the structure

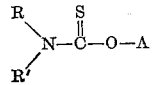

where R and R' are lower alkyl groups and A is a 2-chloroethyl group.

5. The method of destroying vegetation which comprises applying to germinating seedlings a phytotoxic amount of a composition containing as the essential active ingredient 2-chloroethyl diethylthionocarbamate.

6. The method of destroying vegetation which comprises applying to germinating seedlings a phytotoxic amount of a composition containing as the essential active ingredient 2-chloroethyl dipropylthionocarbamate.

7. A herbicide composition comprising a major proportion of a herbicidal adjuvant as carrier and a minor but phytotoxic concentration of a halogen substituted alkyl ester of a thionocarbamic acid in which the alkyl ester group contains less than five carbon atoms and in which the nitrogen is attached to one cyclohexyl group and to one lower alkyl group.

8. A herbicide composition comprising a major proportion of a herbicidal adjuvant as carrier and a minor but phytotoxic concentration of a compound of the structure

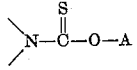

where A represents a halogen substituted alkyl group containing less than five carbon atoms and the valences on the nitrogen are satisfied by a member of the group consisting of lower alkyl, lower alkenyl, halogen substituted lower alkenyl, cyclohexyl, cyclohexenyl, cyanoethyl, phenoxy substituted lower alkyl, alkoxy substituted lower alkyl, alkenoxy substituted lower alkyl, and aliphatic divalent radicals which, with the nitrogen, constitute a heterocyclic radical selected from the group consisting of morpholinyl, 2,6 - dimethylmorpholinyl, pyrrolidinyl, 4-phenyl-1-piperazinyl, piperidino, 2-methylpiperidino, 5-ethyl-2-methylpiperidino, 5-ethyl-3-methylpiperidino and 2,4,6-trimethylpiperidino.

9. A herbicide composition comprising a major proportion of a herbicidal adjuvant as carrier and a minor but phytotoxic concentration of a compound of the structure

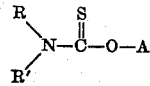

where R and R' are lower alkyl groups and A is a halogen substituted ethyl group.

10. A herbicide composition comprising a major proportion of a herbicidal adjuvant as carrier and a minor but phytotoxic concentration of a compound of the structure

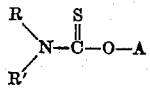

where R and R' are lower alkyl groups and A is a 2-chloroethyl group.

11. A herbicide composition comprising a major proportion of a herbicidal adjuvant as carrier and a minor but phytotoxic concentration of 2-chloroethyl diethylthionocarbamate.

12. A herbicide composition comprising a major proportion of a herbicidal adjuvant as carrier and a minor but phytotoxic concentration of 2-chloroethyl dipropylthionocarbamate.

13. Method of destroying vegetation which comprises applying to germinating seedlings a phytotoxic amount of a composition containing as the essential active ingredient a compound of the structure

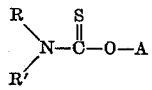

where R and R' are lower alkyl groups and A is a middle halogen substituted lower alkyl group.

References Cited in the file of this patent
UNITED STATES PATENTS

| | | |
|---|---|---|
| 2,225,124 | Martin | Dec. 17, 1940 |
| 2,650,876 | Stewart | Sept. 1, 1953 |